(12) United States Patent
Ohtomo et al.

(10) Patent No.: US 10,371,801 B2
(45) Date of Patent: Aug. 6, 2019

(54) MEASURING INSTRUMENT

(71) Applicant: TOPCON Corporation, Tokyo-to (JP)

(72) Inventors: Fumio Ohtomo, Saitama (JP); Kaoru Kumagai, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 321 days.

(21) Appl. No.: 15/243,025

(22) Filed: Aug. 22, 2016

(65) Prior Publication Data
US 2017/0059696 A1 Mar. 2, 2017

(30) Foreign Application Priority Data
Aug. 26, 2015 (JP) ................................. 2015-166454

(51) Int. Cl.
| | |
|---|---|
| *G01C 3/08* | (2006.01) |
| *G01S 7/48* | (2006.01) |
| *G01C 1/02* | (2006.01) |
| *G01C 9/18* | (2006.01) |
| *G01C 15/00* | (2006.01) |
| *G01S 17/08* | (2006.01) |

(52) U.S. Cl.
CPC .............. *G01S 7/4808* (2013.01); *G01C 1/02* (2013.01); *G01C 3/08* (2013.01); *G01C 9/18* (2013.01); *G01C 15/002* (2013.01); *G01S 17/08* (2013.01)

(58) Field of Classification Search
CPC .......... G01S 17/08; G01S 7/4808; G01C 3/08
USPC ....................................................... 356/4.01
See application file for complete search history.

(56) References Cited

U.S. PATENT DOCUMENTS

| | | | | |
|---|---|---|---|---|
| 6,330,523 B1* | 12/2001 | Kacyra | ............... | G01B 11/002 |
| | | | | 250/336.1 |
| 2006/0242850 A1* | 11/2006 | Ammann | ............. | G01C 15/004 |
| | | | | 33/290 |
| 2012/0216413 A1* | 8/2012 | Adegawa | ................ | G01C 9/00 |
| | | | | 33/290 |

(Continued)

FOREIGN PATENT DOCUMENTS

WO          99/57695 A1     11/1999

OTHER PUBLICATIONS

European communication dated Jan. 17, 2017 in corresponding European patent application No. 16185323.9.

(Continued)

*Primary Examiner* — Mark Hellner
(74) *Attorney, Agent, or Firm* — Nields, Lemack & Frame, LLC

(57) ABSTRACT

The invention provides a measuring instrument, which comprises a measuring unit for projecting a distance measuring light toward an object to be measured and for performing a distance measurement by receiving a reflected light from the object to be measured, and an attitude detecting device integrally provided with the measuring unit, wherein the attitude detecting device has tilt sensors for detecting a horizontality and relative tilt angle detectors for tilting the tilt sensors and for detecting a tilt angle of the measuring unit with respect to the horizontality under such condition that the tilt sensors detects the horizontality so that the horizontality is detected by the tilt sensor, and wherein the distance measurement of the object to be measured is performed by the measuring unit, and a vertical angle of a measuring point is determined based on the result of the tilt detection by the attitude detecting device.

5 Claims, 4 Drawing Sheets

(56) References Cited

U.S. PATENT DOCUMENTS

2017/0059709 A1   3/2017   Ohtomo et al.

OTHER PUBLICATIONS

Notice of allowance dated Mar. 22, 2019 in co-pending U.S. Appl. No. 15/243,043.

* cited by examiner

MEASURING INSTRUMENT

BACKGROUND OF THE INVENTION

The present invention relates to a measuring instrument, which projects a distance measuring light and measures a distance to an object to be measured by receiving a reflected light from the object to be measured.

As one of the measuring instruments, which projects a distance measuring light to the object to be measured, performs a distance measurement and an angle measurement of the measuring point and determines three-dimensional coordinates of the measuring point, a total station is known.

A conventional type total station is mounted on a fixing means such as a tripod or the like, and is installed at a predetermined point via the fixing means. Further, an installment of the total station is attended with a leveling operation in order to obtain a vertical reference.

On a measuring instrument with high accuracy such as the total station or the like, the vertical reference of high accuracy is required. Therefore, a high accuracy tilt sensor is used as a sensor for detecting a horizontality.

The high accuracy tilt sensor can detect the horizontality with high accuracy, but a range of a measurement is narrow, and the range is about 6 arc minutes at most.

For this reason, as a preparation to perform the leveling, an operator performs leveling manually so that the total station will be approximately horizontal, i.e., a tilting of the total station will be within a detection range of the tilt sensor.

Further, with respect to an installing place of the fixing means, there is a restriction that the place must be selected where the total station, as put on, will be approximately horizontal so as to enable to perform leveling, or the like.

SUMMARY OF THE INVENTION

It is an object of the present invention to provide a measuring instrument, by which it is possible to perform a measurement by an operator without performing leveling operation.

To attain the object as described above, a measuring instrument according to the present invention comprises a measuring unit for projecting a distance measuring light toward an object to be measured and for performing a distance measurement by receiving a reflected light from the object to be measured, and an attitude detecting device integrally provided with the measuring unit, wherein the attitude detecting device has tilt sensors for detecting a horizontality and relative tilt angle detectors for tilting the tilt sensors and for detecting a tilt angle of the measuring unit with respect to the horizontality under such condition that the tilt sensors detects the horizontality so that the horizontality is detected by the tilt sensor, and wherein the distance measurement of the object to be measured is performed by the measuring unit, and a vertical angle of a measuring point is determined based on the result of the tilt detection by the attitude detecting device.

Further, the measuring instrument according to the present invention further comprises an image pickup unit having an image pickup optical axis running in parallel to an optical axis of the measuring unit and a display unit for displaying an image picked up by the image pickup unit, wherein the image pickup unit acquires an image including the object to be measured, and the image is displayed on the display unit.

Further, in the measuring instrument according to the present invention, the measuring unit and the attitude detecting device are accommodated in a casing, and the casing is designed as portable.

Further, in the measuring instrument according to the present invention, the measuring unit and the attitude detecting device are accommodated in a casing, the casing is mounted on an installment base unit, the installment base unit rotatably supports the casing in an up-to-bottom direction and rotatably supports in a left-to-right direction, and the installment base unit is provided with a left-to-right angle detector for detecting a rotation angle in the left-to-right direction.

Furthermore, in the measuring instrument according to the present invention, the tilt sensors comprise a first tilt sensor with high accuracy and a second tilt sensor with high responsiveness.

According to the present invention, the measuring instrument comprises a measuring unit for projecting a distance measuring light toward an object to be measured and for performing a distance measurement by receiving a reflected light from the object to be measured, and an attitude detecting device integrally provided with the measuring unit, wherein the attitude detecting device has tilt sensors for detecting a horizontality and relative tilt angle detectors for tilting the tilt sensors and for detecting a tilt angle of the measuring unit with respect to the horizontality under such condition that the tilt sensors detects the horizontality so that the horizontality is detected by the tilt sensor, and wherein the distance measurement of the object to be measured is performed by the measuring unit, and a vertical angle of a measuring point is determined based on the result of the tilt detection by the attitude detecting device. As a result, it is possible to perform the measurement without leveling, and working efficiency can be improved.

DETAILED DESCRIPTION OF THE PREFERRED EMBODIMENTS

A description will be given below on embodiments of the present invention by referring to the attached drawings.

Figure 1:
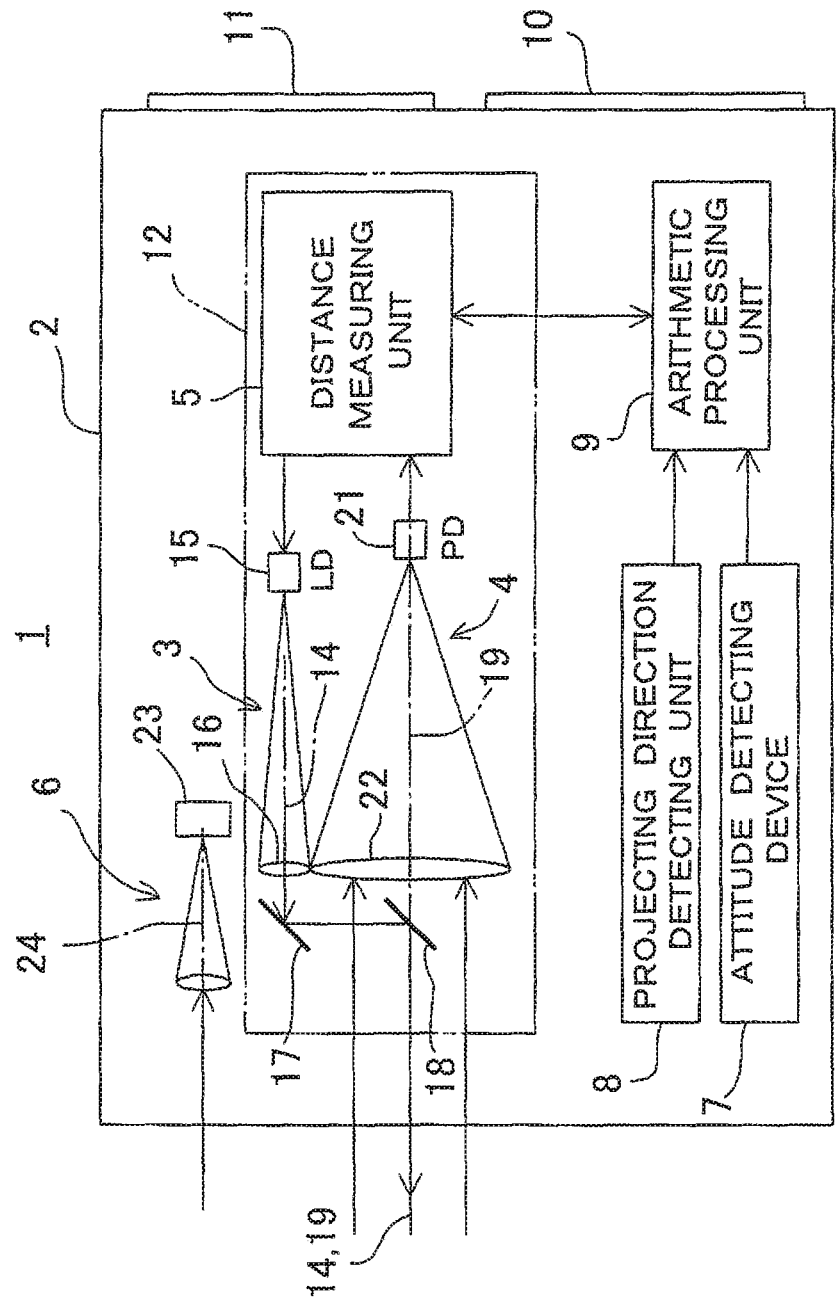
FIG. 1 is a schematical block diagram to show an embodiment according to the present invention.

FIG. 1 shows a measuring instrument 1 according to the embodiment.

The measuring instrument 1 primarily comprises a casing 2, a distance measuring light projecting unit 3, a light receiving unit 4, a distance measuring unit 5, an image pickup unit 6, an attitude detecting device 7, a projecting direction detecting unit 8, an arithmetic processing unit 9, an operation unit 10, and a display unit 11. It is to be noted that the display unit 11 may be designed as a touch panel and the display unit 11 may also serve as the operation unit 10.

The light receiving unit 4, the distance measuring unit 5, the image pickup unit 6, the attitude detecting device 7, the projecting direction detecting unit 8, the arithmetic processing unit 9, the operation unit 10 and the display unit 11 are accommodated in the casing 2 and are integrated together.

The casing 2 is designed as portable. Preferably, the casing 2 can be handheld by one hand, and the operation unit 10 is designed so as to be operatable under such condition that the measuring instrument 1 is held by a single hand.

Further, the distance measuring light projecting unit 3, the light receiving unit 4, and the distance measuring unit 5 make up together a measuring unit 12.

The distance measuring light projecting unit 3 has a projection optical axis 14, and a light emitting element 15, e.g. a laser diode (LD), is provided on the projection optical axis 14. Further, a projection lens 16 is provided on the projection optical axis 14. Further, the projection optical axis 14 is deflected so that the projection optical axis 14 coincides with a light receiving optical axis 19 (to be described later) by optical axis deflecting members 17 and 18.

A description will be given on the light receiving unit 4. A reflected distance measuring light from the object to be measured enters the light receiving unit 4. The light receiving unit 4 has the light receiving optical axis 19, and the projection optical axis 14 deflected by the optical axis deflecting members 17 and 18 coincides with the light receiving optical axis 19.

A photodetection element 21, e.g. a photodiode (PD), is disposed on the light receiving optical axis 19 and produces a photodetection signal. On the side of the object of the light receiving optical axis 19, a light receiving lens 22 is disposed, and the light receiving lens 22 focuses an incident light on the photodetection element 21.

The distance measuring unit 5 controls the light emitting element 15 and makes the light emitting element 15 emit a laser beam as a distance measuring light and projects the distance measuring light to the object to be measured. The reflected distance measuring light as reflected from the object to be measured enters the light receiving lens 22 and is focused on the photodetection element 21 by the light receiving lens 22 and is received by the photodetection element 21. It is to be noted that the distance measuring light may be an invisible light or may be a visible light.

The photodetection element 21 sends the photodetection signal to the distance measuring unit 5, and the distance measuring unit 5 performs a distance measurement of a measuring point (i.e. a point where the distance measuring light is projected) based on the photodetection signal from the photodetection element 21.

The image pickup unit 6 acquires image data including the object to be measured. The image pickup unit 6 has an image pickup optical axis 24, which is extended in a horizontal direction under such condition that the casing 2 is in a horizontal position, and the image pickup optical axis 24 and the projection optical axis 14 are set so as to run in parallel to each other. Further, a distance between the image pickup optical axis 24 and the projection optical axis 14 is set to a known value.

An image pickup element 23 of the image pickup unit 6 is a CCD or CMOS sensor, which is an aggregate of pixels, and it is so arranged that a position of each pixel can be specified on an image element. For instance, for each pixel, the position can be specified on a coordinate system having the image pickup optical axis 24 as an origin point.

The attitude detecting device 7 has a horizontal detecting unit 25 (to be described later) for detecting a horizontality and a relative tilt angle detecting unit (to be described later) for detecting a relative tilt angle and a relative tilting direction (hereinafter referred as "relative tilt angle") between the horizontality as detected by the horizontal detecting unit 25 and the measuring unit 12 (or the casing 2). By detecting the relative tilt angle, the tilt angle and the tilting direction of the measuring unit 12 (i.e. the image pickup optical axis 24) with respect to the horizontality are detected. The relative tilt angle thus detected is inputted to the arithmetic processing unit 9.

The projecting direction detecting unit 8 detects a relative projecting direction of the projection optical axis 14 with respect to the casing 2 based on the result of the detection by the attitude detecting device 7.

Further, the projecting direction detecting unit 8 detects a left-to-right angle and an up-to-bottom angle of the projection optical axis 14 in a case where the measuring instrument 1 is installed in a fixed manner. Here, the left-to-right angle is defined as a tilt angle when the optical axis 14 is tilted in a vertical direction with respect to a paper surface under such condition as shown in FIG. 1. Under such condition as shown in FIG. 1, the up-to-bottom angle is defined as a tilt angle when the optical axis 14 is tilted in an up-to-bottom direction with respect to the paper surface.

The arithmetic processing unit 9 comprises an input-output control unit, an arithmetic unit (CPU), a storage unit, and others. In the storage unit, a distance measuring program for controlling a distance measuring operation, and an image display program for displaying image data, distance measuring data, or the like on the display unit 11 are stored. Further, in the storage unit, the results of measurement such as the distance measurement data, the image data, or the like are stored.

The relative tilt angle of the measuring unit 12 is always detected by the attitude detecting device 7. Therefore, a distance measurement to the object to be measured can be performed without performing leveling of the measuring instrument 1, and the up-to-bottom angle at the measuring point can be measured. Further, the result of distance measurement can be corrected based on the up-to-bottom angle, and an accurate horizontal distance can be measured.

Further, an image of the object to be measured is picked up by the image pickup unit 6, and the picked up image is displayed on the display unit 11. The operator can perform measurement while confirming the object to be measured and the measurement position based on the image as displayed on the display unit 11. Therefore, the operator captures the object to be measured from an image on the display unit 11, makes the image pickup optical axis 24 (e.g. the center of the image) coincide with the measuring point and performs measurement. Thereby, the distance measurement of the measuring point is performed.

Further, there is no need to perform the leveling, and the operator can perform the measurement under such condition that the measuring instrument 1 is carried.

It is to be noted that in a case where the measuring point is to be confirmed, the measuring point can be confirmed by projecting the distance measuring light when the distance measuring light as emitted from the light emitting element 15 is turned to be a visible light.

Next, by referring to FIG. 2 to FIG. 4, a description will be given on the attitude detecting device 7.

Figure 2:
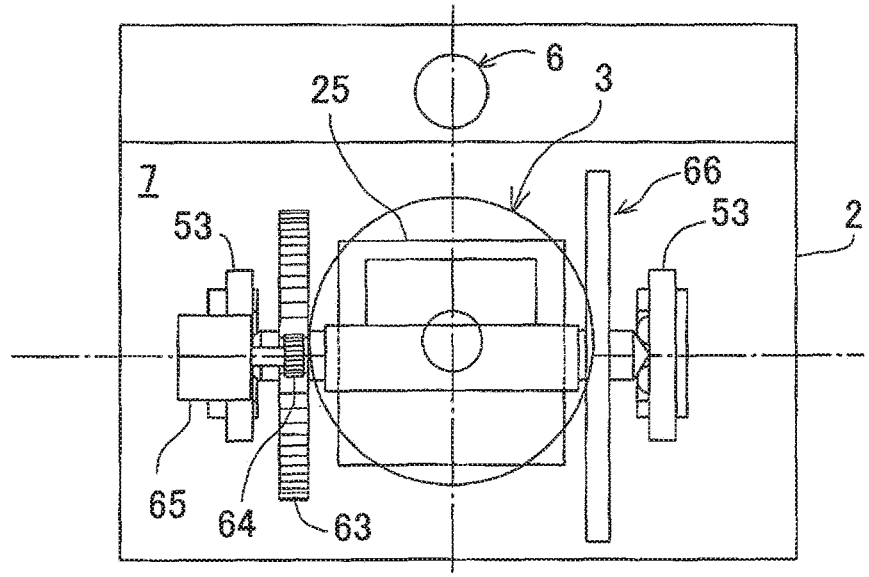
FIG. 2 is a front view of an attitude detecting device to be used in the embodiment.
Figure 3:
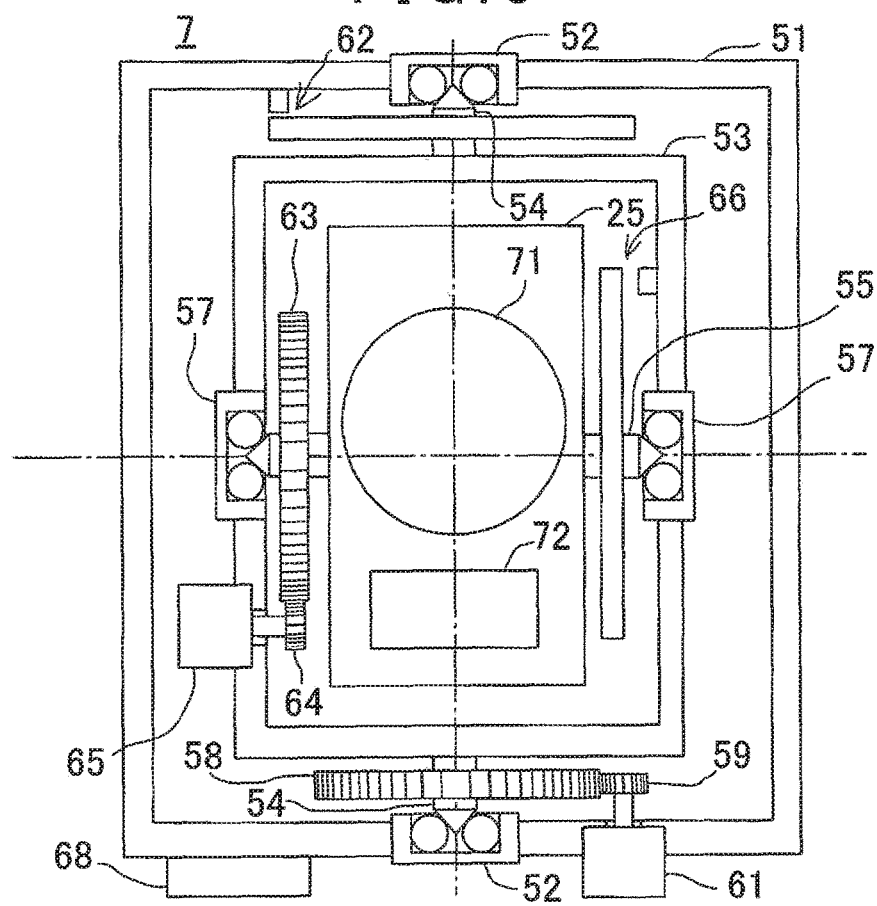
FIG. 3 is a plan view of the attitude detecting device to be used in the embodiment.
Figure 4:
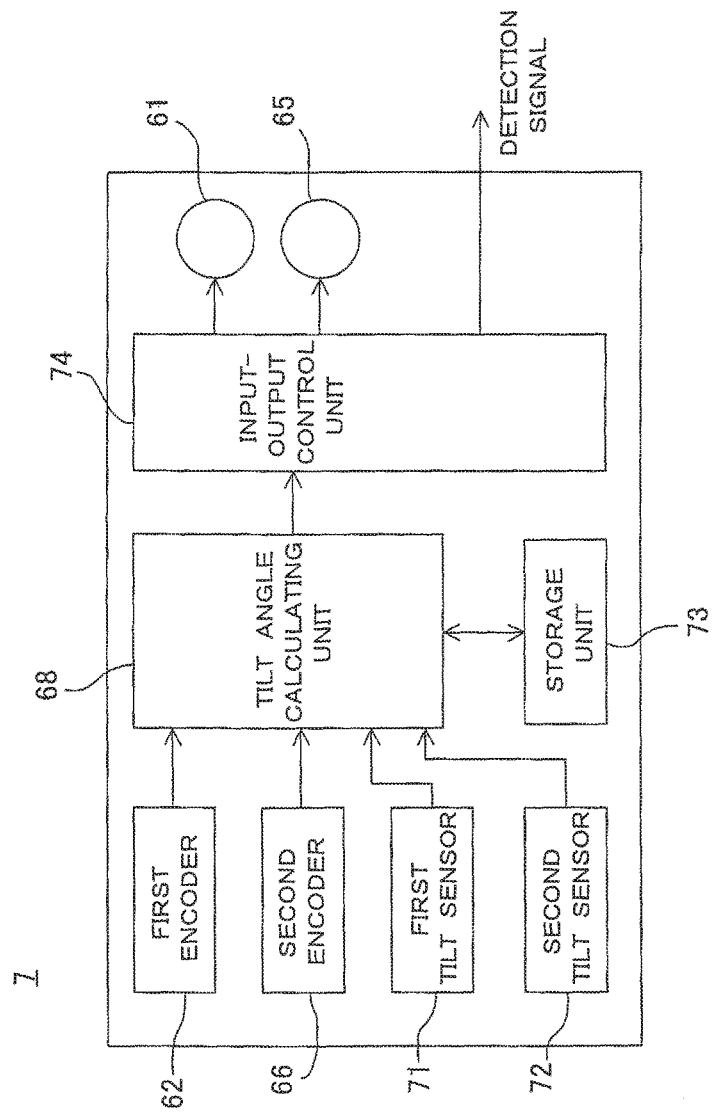
FIG. 4 is a schematical block diagram of the attitude detecting device.

FIG. 2 shows a front view under such condition that the attitude detecting device 7 is installed at a horizontal position, and FIG. 3 shows a plan view of the attitude detecting device 7. In FIG. 2, when the attitude detecting device 7 detects the horizontality of the casing 2, the distance measuring light projecting unit 3 is associated with the attitude detecting device 7 so that the projection optical axis 14 is maintained in the horizontal position. Further, in FIG. 2 and FIG. 3, what are equivalent to component as shown in FIG. 1 is referred by the same symbol.

The attitude detecting device 7 has the horizontal detecting unit 25 for detecting the horizontality. As to be described below, the horizontal detecting unit 25 has a structure as supported horizontally via a gimbal mechanism.

An inner frame 53 with a rectangular frame shape is provided inside an outer frame 51 with a rectangular frame shape, and the horizontal detecting unit 25 is provided inside the inner frame 53. The outer frame 51 is fixed on the casing 2 or the outer frame 51 doubles as the casing 2.

First horizontal shafts 54 and 54 are protruded from an upper surface and a lower surface (see FIG. 3) of the inner frame 53 respectively, and the first horizontal shafts 54 and 54 are rotatably fitted in bearings 52 and 52 as provided on the outer frame 51. The first horizontal shafts 54 and 54 have a first horizontal axis respectively extending in a horizontal direction, and inner frame 53 is rotatable over 360° in a vertical direction around the first horizontal shafts 54 and 54 as the center.

The horizontal detecting unit 25 is supported by a second horizontal shaft 55, and both end portions of the second horizontal shaft 55 are rotatably fitted in bearings 57 and 57 as provided on the inner frame 53. The second horizontal shaft 55 has a second horizontal axis which orthogonally crosses the first horizontal axis and extends in a horizontal direction. The horizontal detecting unit 25 is rotatable over 360° in the vertical direction around the second horizontal shaft 55 as the center.

Thus, the horizontal detecting unit 25 is rotatably supported in two axial directions with respect to the outer frame 51, and a mechanism to rotatably support the inner frame 53 and a mechanism to rotatably support the horizontal detecting unit 25 make up together a gimbal mechanism. Thus, the horizontal detecting unit 25 is supported via the gimbal mechanism with respect to the outer frame 51. Further, since there is no mechanism to restrict a rotation of the inner frame 53, the horizontal detecting unit 25 is designed as rotatable in all directions with respect to the outer frame 51.

On one of the first horizontal shafts 54 and 54, e.g. on the first horizontal shaft 54 on lower side in FIG. 3, a first driven gear 58 is fixed on, and a first driving gear 59 is meshed with the first driven gear 58. Further, a first motor 61 is provided on the lower surface of the outer frame 51, and the driving gear 59 is fixed on an output shaft of the first motor 61.

On the other of the first horizontal shafts 54 and 54, a first encoder 62 is provided. The first encoder 62 is adapted to detect a first rotation angle (a first tilt angle) of the inner frame 53 with respect to the outer frame 51.

On one end portion of the second horizontal shaft 55, a second driven gear 63 is fixed, and a second driving gear 64 is meshed with the second driven gear 63. Further, on a side surface (on a left side surface in the figure) of the inner frame 53, a second motor 65 is provided, and the second driving gear 64 is fixed on the output shaft of the second motor 65.

On the other end portion of the second horizontal shaft 55, a second encoder 66 is provided, and the second encoder 66 is adapted to detect a second rotation angle (a second tilt angle) of the horizontal detecting unit 25 with respect to the inner frame 53.

The first encoder 62 and the second encoder 66 are electrically connected to a tilt angle calculating unit 68.

The horizontal detecting unit 25 has a first tilt sensor 71 and a second tilt sensor 72, and the first tilt sensor 71 and the second tilt sensor 72 are electrically connected to the tilt angle calculating unit 68.

Further, by referring to FIG. 4, a description will be given on the attitude detecting device 7.

The attitude detecting device 7 comprises the first encoder 62, the second encoder 66, the first tilt sensor 71, the second tilt sensor 72, the tilt angle calculating unit 68, the first motor 61 and the second motor 65. Further, the attitude detecting device 7 comprises a storage unit 73 and an input-output control unit 74.

In the storage unit 73, programs such as a calculation program for attitude detection or the like and data such as calculation data are stored or the like.

The input-output control unit 74 drives the first motor 61 and the second motor 65 based on a control command as outputted from the tilt angle calculating unit 68, tilts the horizontal detecting unit 25 and the inner frame 53 and controls so that the horizontal detecting unit 25 detects the horizontality.

The first tilt sensor 71 is to detect the horizontality with high accuracy. For instance, the first tilt sensor 71 is a tilt detector for detecting the horizontality depending on a change of a reflection angle of a reflection light by projecting a detection light to a horizontal liquid surface or an air bubble tube for detecting the tilt depending on a positional change of an air bubble as sealed. Further, the second tilt sensor 72 is to detect a tilt change with high responsiveness. For instance, the second tilt sensor 72 is an acceleration sensor.

Each of the first tilt sensor 71 and the second tilt sensor 72 is capable of individually detecting tilts in two axial directions of a rotating direction (a tilt direction) detected by the first encoder 62 and a rotating direction (a tilt direction) detected by the second encoder 66.

The tilt angle calculating unit 68 calculates a tilt angle and a tilting direction based on the results of the detection from the first tilt sensor 71 and the second tilt sensor 72. Further, the tilt angle calculating unit 68 calculates a rotation angle of the first encoder 62 and a rotation angle of the second encoder 66 corresponding to the tilt angle and the tilting direction.

By synthesizing the rotation angle of the first encoder 62 and the rotation angle of the second encoder 66 thus calculated, a tilt angle and a tilting direction are calculated. The tilt angle and the tilting direction correspond to tilt angle and tilting direction (i.e. relative tilt angle) of the casing 2 with respect to the horizontality, i.e. the tilt angle and the tilting direction (the relative tilt angle) of the measuring unit 12.

The first motor 61, the second motor 65, the first encoder 62, the second encoder 66, and the tilt angle calculating unit 68 make up together the relative tilt angle detecting unit.

The attitude detecting device 7 is set up in such a manner that the first tilt sensor 71 detects the horizontality in a case where the outer frame 51 is installed horizontally (i.e. in a case where the measuring instrument 1 is installed horizontally). Further, the attitude detecting device 7 is set in such a manner that both the output of the first encoder 62 and the output of the second encoder 66 indicate a reference position (the rotation angle 0°) respectively.

A description will be given below on an operation of the attitude detecting device 7.

First, a description will be given on a case where tilting is detected with high accuracy.

The case where tilting is detected with high accuracy is, e.g., a case where the attitude detecting device 7 is installed on a surveying instrument of installation type.

When the attitude detecting device 7 is tilted, the first tilt sensor 71 outputs a signal corresponding to the tilting.

The tilt angle calculating unit 68 calculates a tilt angle and a tilting direction based on the signals from the first tilt sensor 71. Further, the tilt angle calculating unit 68 calculates rotation amounts of the first motor 61 and the second motor 65 for setting the tilt angle and the tilting direction to 0 based on the results of calculation and issues a driving command to drive the first motor 61 and the second motor 65 via the input-output control unit 74 by the rotation amount.

The first motor 61 and the second motor 65 are driven so as to be tilted reversely to the tilt angle and the tilting direction as calculated by driving the first motor 61 and the second motor 65. Driving amount (i.e. rotation angle) of each of the first motor 61 and the second motor 65 is detected by the first encoder 62 and the second encoder 66 respectively, and when the rotation angle is equal to the result of the calculation, the driving of the first motor 61 and the second motor 65 is stopped.

Further, the rotation of the first motor 61 and the second motor 65 are finely adjusted so that the first tilt sensor 71 detects the horizontality.

Under this condition, the horizontal detecting unit 25 is controlled horizontally under such condition that the outer frame 51 is tilted.

Therefore, a tilt angle and a tilting direction, as occurred by the fact that in order to make the horizontal detecting unit 25 horizontal, the first motor 61 and the second motor 65 tilt the inner frame 53 and the horizontal detecting unit 25, are obtained based on a rotation angle detected by the first encoder 62 and the second encoder 66.

The tilt angle calculating unit 68 calculates a tilt angle and a tilting direction of the attitude detecting device 7 based on the results of the detection by the first encoder 62 and the second encoder 66 when the first tilt sensor 71 detects the horizontality. The result of this calculation indicates an attitude of the attitude detecting device 7 after the tilting.

The tilt angle calculating unit 68 outputs the tilt angle and tilting direction as calculated to outside, i.e. to the arithmetic processing unit 9, as a detection signal of the attitude detecting device 7.

It is needless to say that the tilt angle and the tilting direction as detected by the attitude detecting device 7 are the tilt angle and the tilting direction of the light receiving optical axis 19 and the image pickup optical axis 24 with respect to the horizontality. Based on the results of the detection of the attitude detecting device 7, the distance measuring unit 5 corrects the result of distance measurement. Therefore, the precise measurement can be carried out regardless of whatever attitude the measuring instrument 1 takes.

Next, a description will be given on an operation of the attitude detecting device 7 in a case where the measurement is performed under such condition that the measuring instrument 1 is carried by the operator.

Under carried condition, the attitude of the attitude detecting device 7 is changed every moment. Therefore, the attitude detection is performed based on the results of detection of the second tilt sensor 72 with high responsiveness.

First, a horizontal condition is detected by the first tilt sensor 71, and the attitude change thereafter is obtained by the second sensor 72 with high responsiveness. If the attitude detection is controlled based on the result of detection from the second tilt sensor 72, the tilt angle and the tilting direction of the attitude detecting device 7 can be detected at real time.

Further, as shown in the structure given in FIG. 2 and FIG. 3, there is nothing to restrict the rotation of the horizontal detecting unit 25 and the rotation of the inner frame 53. Therefore, both the horizontal detecting unit 25 and the inner frame 53 can be rotated over 360° or more. That is, regardless of whatever attitude the attitude detecting device 7 takes (e.g. even when the attitude detecting device 7 is upside down), the attitude detection can be performed in all directions.

Therefore, there is no restriction on the tilt measuring range, and it is possible to perform the attitude detection in a wide range and in any of the attitudes.

In a case where high responsiveness is required, the attitude detection is performed based on the result of the detection by the second tilt sensor 72. However, the second tilt sensor 72 is generally lower in detection accuracy as compared with the first tilt sensor 71.

In the present embodiment, the first tilt sensor 71 with high accuracy and the second tilt sensor 72 with high responsiveness are provided. As a result, the attitude detection can be performed with high accuracy based on the result of the detection by the second tilt sensor 72 only.

Based on the tilt angle detected by the second tilt sensor 72, the first motor 61 and the second motor 65 are driven so that the tilt angle will be 0, and further, the driving of the first motor 61 and the second motor 65 is continued until the first tilt sensor 71 detects the horizontality. In case a deviation occurs between the values of the first encoder 62 and the second encoder 66 when the first tilt sensor 71 detects the horizontality—that is, in case the deviation occurs between an actual tilt angle and the tilt angle detected by the second tilt sensor 72, it is possible to calibrate the tilt angle of the second tilt sensor 72 based on the deviation.

Therefore, if the relation between the detected tilt angle of the second tilt sensor 72 and the tilt angle obtained based on the results of the horizontal detection by the first tilt sensor 71 and based on the detection results of the first encoder 62 and the second encoder 66 is obtained, it is possible to perform a calibration of the tilt angle detected by the second tilt sensor 72. By this calibration, accuracy can be improved in the attitude detection with high responsiveness by the second tilt sensor 72.

By the fact that the horizontal detecting unit 25 is used as a combination of the first tilt sensor 71 with high accuracy and the second tilt sensor 72 with high responsiveness, the measuring instrument 1 is mounted on a mobile object such as automobile and the measurement can be performed with high accuracy while the mobile object is moving.

It is to be noted that in a case where the measuring instrument 1 is supported in a stable condition or in a case where the measuring instrument 1 is supported in a less moving condition in a condition where the first tilt sensor 71 with high accuracy can be followed up, the second tilt sensor 72 with high responsiveness may be omitted. For instance, in a case where the measuring instrument 1 is installed on an auxiliary unit such as a pole or the like and the measurement is performed by erecting the pole on a ground surface, or the like, a condition is with less moving and in the stable condition. Therefore, the second tilt sensor 72 with high responsiveness may be omitted.

On the other hand, in a case where a following characteristic is required but high accuracy is not required, the first tilt sensor 71 may be omitted and only the second tilt sensor 72 may be used.

Figure 5:
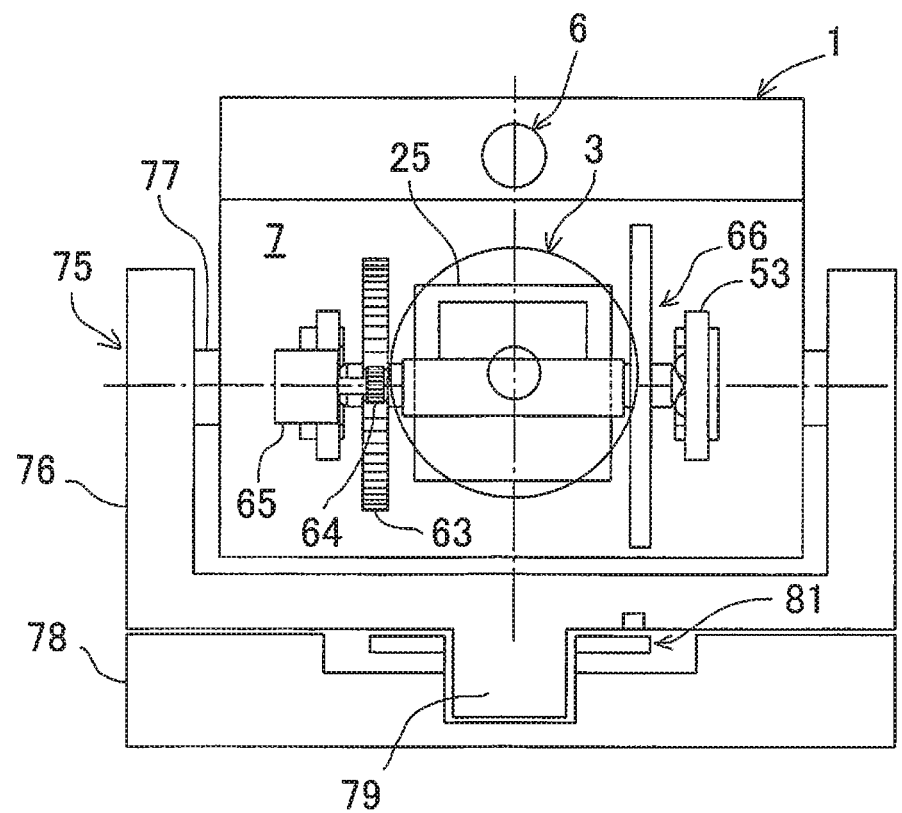
FIG. 5 is a front view of an attitude detecting device to show another embodiment according to the present invention.

FIG. 5 shows another embodiment.

In another embodiment, the measuring instrument 1 as described above further comprises an installment base unit 75. In FIG. 5, a description regarding the measuring instrument 1 will be omitted. Further, the measuring instrument 1 equipped with the installment base unit 75 is portable or preferably handheld.

The installment base unit 75 has a frame member 76 and a base unit 78.

The frame member 76 is designed in a recessed form having a recessed portion, and the measuring instrument 1 is accommodated in the recessed portion. The measuring instrument 1 is supported on the frame member 76 via an up-to-bottom rotation shaft 77, and is designed as rotatable in the up-to-bottom direction around the up-to-bottom rotation shaft 77 as the center.

It is to be noted that although not shown in the figure, a torque generator is provided between the up-to-bottom rotation shaft 77 and the installment base unit 75. The torque generator is designed to give a resistance as required against the rotation of the measuring instrument 1, and the measuring instrument 1 is so arranged that the measuring instrument 1 can maintain the attitude at an arbitrary rotational position (i.e. with an arbitrary tilting).

From the lower surface of the frame member 76, a left-to-right rotation shaft 79 is protruded, and the left-to-right rotation shaft 79 is rotatably fitted to the base unit 78 via a bearing (not shown). The frame member 76 is arranged to be rotatable in a left-to-right direction around the left-to-right rotation shaft 79 as the center.

Further, between the left-to-right rotation shaft 79 and the base unit 78, there is provided a left-to-right angle detector 81 (e.g. an encoder) for detecting the left-to-right angle (an angle in the rotating direction around the left-to-right rotation shaft 79 as the center). It is so arranged that the relative rotation angle in the left-to-right direction of the frame member 76 with respect to the base unit 78 can be detected by a left-to-right angle detector 81.

Further, to the rotation of the frame member 76 against the base unit 78, a resistance as required is provided. For instance, between the frame member 76 and the base unit 78, a friction sheet is provided so that the resistance is given to the rotation by the friction sheet. Therefore, in a case where the frame member 76 is rotated in the left-to-right direction, the attitude of the frame member 76 is maintained by the resistance.

Because the installment base unit 75 is provided, the measuring instrument 1 can be installed at an arbitrary position, and the three-dimensional coordinates of the measuring point can be measured with reference to the installment position.

It is to be noted that the attitude detecting device 7 is associated with the installment base unit 75 so that an axis of the up-to-bottom rotation shaft 77 passes through an intersection between an axis of the first horizontal shafts 54 and 54 and an axis of the second horizontal shaft 55. As a result, it becomes easier to detect the horizontal angle of the measuring unit 12.

A description will be given below on a case where the measuring instrument 1 is installed via the installment base unit 75.

When the installment base unit 75 is installed at an installation surface as required, the horizontality is detected by the attitude detecting device 7, and a tilt angle of the installation surface with respect to the horizontality (hereinafter referred as "installment tilt angle") is detected. This installment tilt angle is used as a correcting information for correcting the results of measurement. The projection optical axis 14 is directed in the direction as required, and the left-to-right angle as detected by the left-to-right angle detector 81 at that moment is set up as a reference position.

The measuring instrument 1 is rotated in the left-to-right direction and further in the up-to-bottom direction so that the projection optical axis 14 is coincided with the point to be measured (i.e. a measuring point). It is judged from the display on the display unit 11 whether or not the projection optical axis 14 is coincided with the measuring point. Or, in a case where the distance measuring light is a visible light, it can be confirmed visually whether or not the projection optical axis 14 is coincided with the measuring point.

The distance to the measuring point is measured by the distance measuring unit 5. Further, the horizontal angle of the measuring point is detected by the left-to-right angle detector 81. The vertical angle of the measuring point is detected by the attitude detecting device 7. Because the vertical angle to be detected by the attitude detecting device 7 includes the installment tilt angle of the installation surface, an angle (a vertical angle) of the projection optical axis 14 with respect to the horizontality is a value, which is obtained by correcting the vertical angle by means of the installment tilt angle. It is to be noted that because the attitude detecting device 7 and the left-to-right angle detector 81 detect the projecting direction of the projection optical axis 14, the attitude detecting device 7 and the left-to-right angle detector 81 fulfill as the projecting direction detecting unit 8 (see FIG. 1).

Thus, three-dimensional coordinates of the measuring point is measured.

According to the present embodiment, a precise measurement can be carried out without performing the leveling operation when the measuring instrument 1 is installed.

The invention claimed is:

1. A measuring instrument, comprising a measuring unit for projecting a distance measuring light toward an object to be measured and for performing a distance measurement by receiving a reflected light from the object to be measured, and an attitude detecting device integrally provided with said measuring unit, wherein said attitude detecting device has tilt sensors for detecting a horizontality and relative tilt angle detectors for tilting said tilt sensors so that the horizontality is detected by said tilt sensors and for detecting a relative tilt angle between said measuring unit and said tilt sensors under such condition that said tilt sensors detects the horizontality, and wherein the distance measurement of the object to be measured is performed by said measuring unit, and a vertical angle of a measuring point is determined based on the result of the tilt detection by said attitude detecting device.

2. The measuring instrument according to claim 1, further comprising an image pickup unit having an image pickup optical axis running in parallel to an optical axis of said measuring unit and a display unit for displaying an image picked up by said image pickup unit, wherein said image pickup unit acquires an image including the object to be measured, and said image is displayed on said display unit.

3. The measuring instrument according to claim 1, wherein said measuring unit and said attitude detecting device are accommodated in a casing, and said casing is designed as portable.

4. The measuring instrument according to claim 1, wherein said measuring unit and said attitude detecting device are accommodated in a casing, said casing is mounted on an installment base unit, said installment base unit rotatably supports said casing in an up-to-bottom direction and rotatably supports in a left-to-right direction, and said installment base unit is provided with a left-to-right angle detector for detecting a rotation angle in the left-to-right direction.

5. The measuring instrument according to claim 1, wherein said tilt sensors comprise a first tilt sensor with high accuracy and a second tilt sensor with high responsiveness.

* * * * *